United States Patent [19]

Tuy et al.

[11] Patent Number: 5,079,699
[45] Date of Patent: Jan. 7, 1992

[54] QUICK THREE-DIMENSIONAL DISPLAY

[75] Inventors: Heang K. Tuy, Chesterland; Todd J. Krochta, Copley, both of Ohio

[73] Assignee: Picker International, Inc., Highland Hts., Ohio

[21] Appl. No.: 391,484

[22] Filed: Aug. 9, 1989

Related U.S. Application Data

[63] Continuation-in-part of Ser. No. 126,368, Nov. 27, 1987, Pat. No. 4,882,679, and a continuation-in-part of Ser. No. 200,697, May 31, 1988.

[51] Int. Cl.$^5$ .................................. G06F 15/42
[52] U.S. Cl. ........................ 364/413.22; 393/124
[58] Field of Search ............... 364/413.19, 413.22, 364/522; 340/729

[56] References Cited

U.S. PATENT DOCUMENTS

| | | | |
|---|---|---|---|
| 4,710,876 | 12/1987 | Cline et al. | 364/413.27 |
| 4,831,528 | 5/1989 | Crawford et al. | 364/413.22 |
| 4,879,668 | 11/1989 | Cline et al. | 364/413.22 |
| 4,882,679 | 11/1989 | Tuy et al. | 364/413.22 |
| 4,914,589 | 4/1990 | Crawford | 364/413.22 |
| 4,945,478 | 7/1990 | Merickel et al. | 364/413.22 |
| 4,953,087 | 8/1990 | Crawford | 364/413.19 |

*Primary Examiner*—Gail O. Hayes
*Attorney, Agent, or Firm*—Fay, Sharpe, Beall, Fagan, Minnich & McKee

[57] ABSTRACT

A diagnostic imaging system generates a three-dimensional display from a series of two-dimensional slice images. A region of interest, defined from a boundary of interest, is selected from one slice and is extrapolated to subsequent slices. Pixels representative of the boundary of interest are isolated and represented by three vectors having an equivalent entries in each. First and second vectors store data representative of first and second coordinates for pixels within each slice. Entries in the third vector corresponds to physical properties of a specimen at a location defined by corresponding entries in the first and second vectors. Areas representative of boundaries of interest falling between slices are extrapolated from vector data from slices neighboring the area. This is accomplished by a linear interpolation of elements of the set of smaller vectors to a number equivalent to the entries in the neighboring larger vectors. Next, a linear extrapolation between respective elements of the lengthened vector and the longer of the vector is made. Finally, a linear interpolation of the intermediate vector to a number of vector elements intermediate the larger and smaller of the neighboring vectors is made. This process is suitably continued during a preselected number of iterations. Finally, a discretized three-dimensional object represented by all sets of first, second, and third vectors are mapped to pixels of an associated pixel frame.

20 Claims, 6 Drawing Sheets

QUICK THREE-DIMENSIONAL DISPLAY

BACKGROUND OF THE INVENTION

This application is continuation-in-part of co-pending U.S. patent application Ser. No. 126,368 now U.S. Pat. No. 4,882,679, filed Nov. 27, 1987 and Ser. No. 200,697 now abandoned, filed May 31, 1988, the contents of both of which are incorporated herein by reference.

This application pertains to the art of diagnostic imaging and more particularly to three-dimensional imaging.

The invention finds applicability to CT scanners and will be described with particular reference thereto. However, it will be appreciated that the invention has broader application in conjunction with generating three-dimensional diagnostic images from data acquired from other imaging modalities, e.g. by magnetic resonance imaging.

In computed tomography ("CT") and magnetic resonance imaging ("MRI"), cross-sectional images of the human anatomy may be generated. Data obtained by the CT or MRI scanners is assembled and a gray scale is assigned in accordance with data obtained from a particular section of the data.

Because organs are three-dimensional in reality, a series of slices or scans must be taken. The series of slices are mentally integrated to visualize the actual anatomy. It would be advantageous to reformat such a series of reconstructed planar images electronically in a more familiar format to aid physicians in their mental integration. Such electronic reformatting would assist communication between radiologists, referring physicians, collaborators, and their patients. Better planning in medical treatments or surgical operations results from the improved communication.

In the last decade, there have been many suggested methods to reformat cross-sectional images and present them as a three-dimensional image from any perspective view. Essentially, five different approaches have been tried. These include the cuberille approach, the octree approach, the ray tracing approach, the triangulation approach, and the contour approach. In the cuberille approach, for example, preprocessing of original image data is required as the underlying model of this approach assumes that the three-dimensional object is composed of cubes of the same size. Each of these approaches, however, suffers from its own distinct disadvantageous.

In order for a three-dimensional imaging processor to become practically useful, a system response must be extremely fast, ideally less than one second per frame if not real time. In the prior art systems, implementation at such speeds could only be achieved with use of special purpose hardware. Such special purpose hardware is extremely expensive and is generally not cost effective. Such dedicated hardware is not usable for other process operations except for its designated three-dimensional reformatting.

Another disadvantage of the prior art lies particularly with the cuberille-type approach. In fact, input data from a CT or MRI scanner is typically not cubic because the distance between two consecutive slices is commonly much larger than the dimensions of the pixels of the reconstructed images. Accordingly, resolution and accuracy are forfeited.

The present invention contemplates a new and improved method and apparatus which overcomes all of the above referred problems and others. Yet, it provides a system for generating three-dimensional diagnostic images which is simple, economical, and readily adaptable to general purpose processor means.

SUMMARY OF THE INVENTION

In accordance with the present invention, a system for forming a three-dimensional image from a plurality of two-dimensional images includes a method and apparatus for acquiring a series of generally parallel image slices from an associated specimen. A subset of voxels is isolated along a contour or boundary of interest within each slice. For each slice, the boundary of interest is represented by three vector arrays. First and second vectors define data representative of first and second coordinates of each voxel of the subset thereof. A third vector represents a viewing value for, and corresponding to, each voxel represented by the first and second dimensions stored in the first and second vectors. A three-dimensional object represented by the first, second, and third vectors of each boundary of interest of each slice is then discretized and mapped and projected to an associated picture frame.

In accordance with a more limited aspect of the present invention, the system further provides for interpolating, from boundaries of interest of neighboring slices, a subset of voxels representative of an intermediate boundary of interest displaced between each of the neighboring slices.

In accordance with a yet more limited aspect of the present invention, the interpolation is accomplished by a series of linear interpolations. In the first, interpolation is made individually amongst first, second, and third vectors of one slice such that they are equal in number to corresponding vectors of a neighboring slice. In the second, interpolation is made between respective elements of respected first, second, and third vectors of the now equivalent-length vectors of neighboring slices, thereby resulting in first, second, and third, interpolated vectors. In the third interpolation, the interpolated vector is shortened to a length intermediate the shorter and longer of the neighboring vectors.

An advantage of the present invention lies with the provision of a system with which a three-dimensional image may be generated quickly by minimizing a number of calculations.

Another advantage of the present invention is the provision of a system with which varying resolutions of a three-dimensional image may be provided in accordance with a number of interpolations completed.

Yet another advantage of the present invention is the provision of a system with which a three-dimensional image may be quickly reoriented prior to generating a complete, high resolution three-dimensional image by a completion of interpolations, thereby allowing realtime refinement of a reorientation of an image.

Further advantages will become apparent to one of ordinary skill in the art upon reading and understanding of the following specification.

BRIEF DESCRIPTION OF THE DRAWINGS

The invention may take physical form in certain parts and arrangements of parts, or in various steps and arrangements of steps. The following specification and drawings are for illustrating preferred embodiment and not to be construed as limiting the invention.

DETAILED DESCRIPTION OF THE PREFERRED EMBODIMENTS

Figure 1:
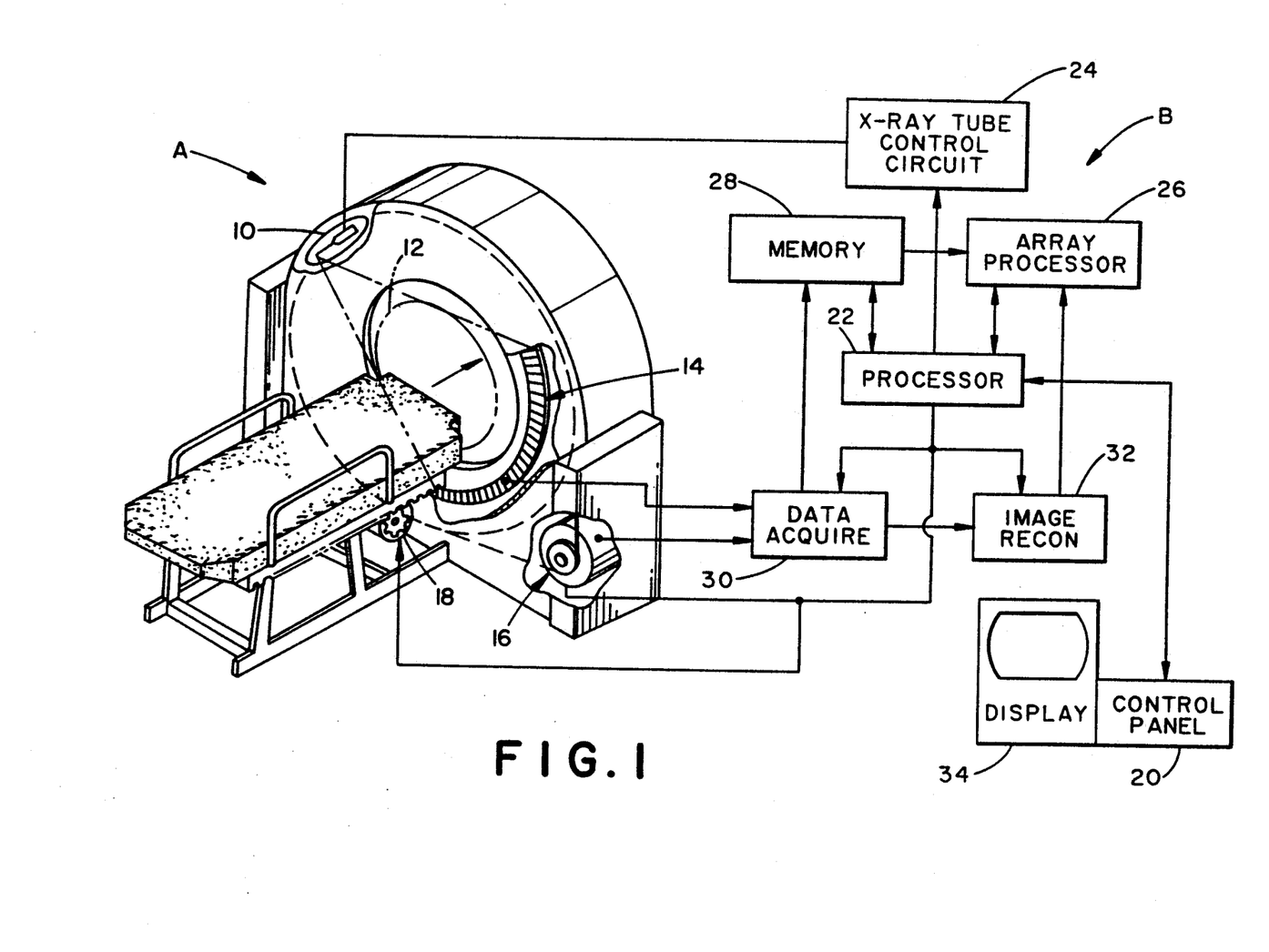
FIG. 1 is a block diagram of a three-dimensional image generating apparatus of the present invention.

Referring now to FIG. 1, an acquisition means for acquiring slice data A is interfaced with a data processor/control circuit B. As illustrated, the acquisition means A is comprised of a CT scanner and will be described with particular reference thereto. It will be appreciated, however, that similar sliced data may readily be acquired by any other suitable slice image apparatus such as a magnetic resonance imaging ("MRI") device.

The CT scanner is comprised of a rotating anode x-ray tube 10 which projects a fan beam of x-rays through an image circle 12 to a detector array 14. The x-ray source 10 is variable in relation to the image circle 12 to provide relative motion therebetween under the control of motor means 16. A plurality of generally parallel slices is obtained by relatively positioning a subject with respect to the image circle 12 between subsequent scans by means such as an incrementing drive means 18. Under direction of a control panel 20, a general processor 22 interfaces an x-ray tube control circuit 24 which facilitates acceleration/deceleration control of the x-ray tube 10, as well as controlling generation the x-ray fan beam. An array processor 26 works under control of a program stored in a memory means 28. The array processor functions in conjunction with the processor 22 and under programming described below. Use of an array processor is advantageous for rapid processing of the three-dimensional image data of the present system.

Slice data is acquired from the acquisition means A via data acquisition circuitry 30. A series of images are reconstructed by the image reconstruction circuitry 32. Finally, a display means 34 allows for viewing of a resultant image.

In the preferred embodiment, the array processor 26 is comprised of one or more processor elements for facilitating rapid computation. It will be appreciated, however, that other processing units will function adequately when images are processed in accordance with the teachings of the present system.

The array processor 26 takes a set of images of consecutive slices of a three-dimensional object (generated by the acquisition means A), via the image reconstruction means 32, and produces spatially encoded slice data indicative of a physical property thereof. Such a set of slices is conveniently referred to as a slice set. The means 32 is provided for assigning a viewing value to generally all subregions of at least one of the generally planar slices. This viewing value is suitably a gray scale level. These images of consecutive slices are given in a format similar to that of a conventional CT or MRI scanner. For example, a reconstruction means is suitably comprised of a convolver and a back projection system which generates a grid of pixel values, the magnitude of which is indicative of a gray scale.

The subject procedure for generating the three-dimensional images renders such a generation to be particularly adaptable to conventional processors such as the subject array processor. Three-dimensional objects under investigation, such as bones or organs, usually extend through many consecutive cross-sectional image slices. For instance, a set of cross-sectional CT images would be required for investigation of a lumbar spine since the spine extends beyond one slice's thickness. To extract the three-dimensional object from the slice efficiently, a three-dimensional box is initially selected which is large enough to encapsulate the three-dimensional object under investigation.

This three-dimensional box, referred to as a box of interest ("BOI"), is smaller than a total volume represented by the slice set. The BOI reduces total information necessary to process and, therefore, reduces the processing time. The BOI apportions each image slice into boundary regions. Each such boundary region is in turn comprised of a plurality of subregions which are represented by data obtained from the data acquisition means. This boundary region is preferably selected on a single slice image and projected or extrapolated onto subsequent slices for practicality. It will be appreciated, however, that in certain situations it may be desirable to select a plurality of boundary regions to encompass a certain volume. For example, a first boundary region might be defined from a slice, and a second, which may have different dimensions, defined on the last slice. Projecting between the first and second boundary regions through the intermediate slices defines a series of intermediate boundary regions. For most purposes, however, a single boundary region with a given set of dimensions extrapolated or projected onto subsequent slices is adequate.

After a boundary region has been defined, a three-dimensional surface, defined by a series of contours or boundaries of interest of a subject is selected from therewithin. This may define, for example, a surface or boundary of an organ or organs. Again, such object is suitably selected from a single boundary region from a single slice and projected onto subsequent boundary regions of the box of interest. In certain situations, however, it is appreciated that the boundary of interest may desirably be selected from two or more of the boundary regions.

Selection of the boundary of interest may be made by manual selection from a display, such as by placing a cursor on that boundary, or by isolating a particular boundary with a given gray scale level. In the preferred embodiment a combination of both is implemented. The region of interest is initially generated as a planar image. A selected range of gray scales is assigned to this region of interest, and only those areas falling within this range are then illuminated. An operator or technician then selects, through the control panel 20 (FIG. 1), which of the surfaces or boundaries within this range are to be taken. This is in turn projected onto subsequent regions of the box of interest.

Figure 2:
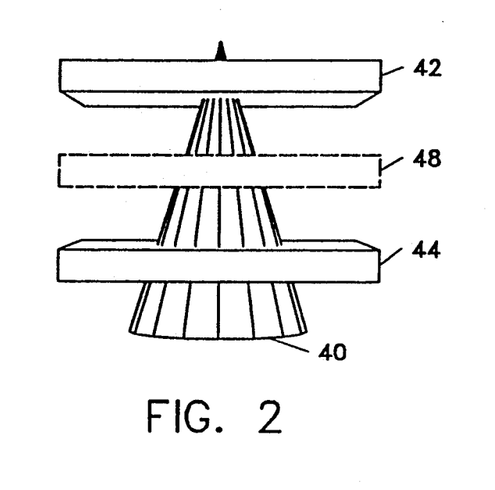
FIG. 2 provides a perspective view of an arbitrary object intersecting first and second slices or image planes and a third image plane interpolated therebetween.

FIG. 2 illustrates a specimen 40 which is a three-dimensional object having arbitrary dimensional characteristics. The specimen 40 is intersected by two usually-parallel image slices 42 and 44. The subject system provides a means for interpolating an approximate intersection between the specimen 40 and a pseudo or slice image 48 disposed between neighboring slices 42 and 44.

Figure 3:
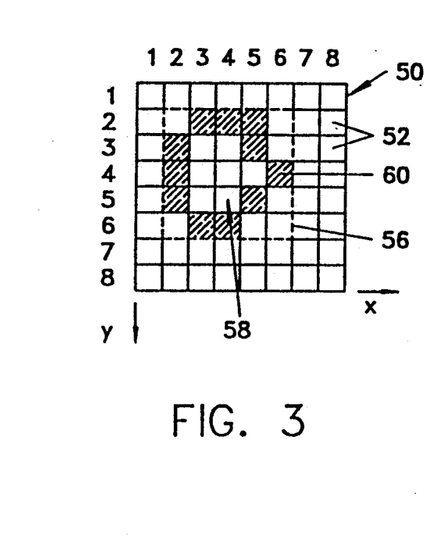
FIG. 3 represents a boundary within a cross-sectional slice of a three-dimensional object.

FIG. 3 illustrates a plan view of an arbitrary slice 50. The slice 50 is comprised of a series of voxels 52. First and second dimensions are illustrated in the figure, the third dimension of the voxel being defined as a thickness of the slice 50. A box of interest 56 intersects the slice 50 as illustrated by the dotted line. The box of interest 56 surrounds a region of interest, which region of interest 58, which is defined by a boundary of interest.

The boundary of interest 60 is defined by an intersection between an image slice and a selected portion of a specimen intersected thereby. In the example of FIG. 3, a boundary of interest is defined by pixels having the following (x,y) coordinates (proceeding clockwise): (3,2), (4,2), (5,2), (5,3), (6,4), (5,5), (4,6), (3,6), (2,5), (2,4), and (2,3).

It will be seen from the forgoing that each contour or boundary of interest for each slice may be represented by three vectors, with vectors for each slice having an equivalent number of entries or length. In the example of FIG. 3, the boundary of interest 60 is defined by the eleven shaded voxels with the above-stated coordinates. Accordingly, vectors describing the boundary of interest for the slice of FIG. 3 would have a length of eleven. The three vectors to describe the boundary of interest include a first vector, in which elements representative of first dimensional coordinates are stored, a second vector, in which coordinates representative of a second dimension are stored, and a third vector, in which a viewing value representative of a physical characteristic of a particular voxel are stored.

Figure 4:
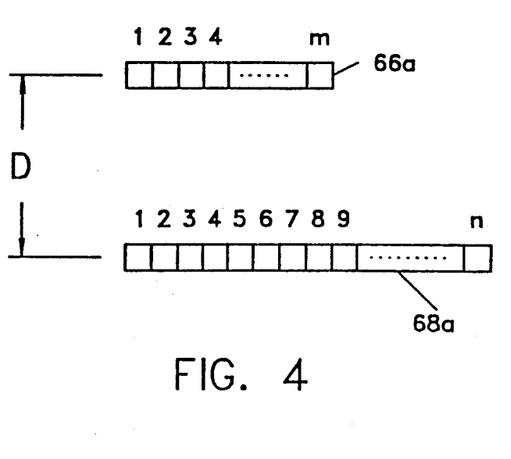
FIG. 4 illustrates vectors of pixels along boundaries corresponding of two neighboring slices.

Turning to FIG. 4, a first vector 66, having a length m and a second vector 68, having a length n are illustrated. The vector 66a is chosen as representative of any one of three vectors in a first slice 66. The vector 68a is chosen as being representative of any vector of a boundary of interest from a slice 68 which neighbors the slice 66, and the content of which corresponds to the content of the vector 66a. It will be appreciated, however, that a correspondence exists between the three vectors identifying the boundary of interest from a slice 66, and the three vectors identifying a boundary of interest from slice 68.

In the illustration of FIG. 4, vectors of the slices 66 and 68 are disposed a distance D from one another, which distance is defined as a distance separating the neighboring slices. As will be seen further below, the subject system provides a means for mapping voxels represented by the three vectors of each slice to an associated viewing screen in accordance with a relative placement thereof to the object represented by the boundaries of interest. Although a viewable object may be made relying solely on data gleaned from the voxels of the image slices, additional resolution is often necessary to provide for full visualization of the three-dimensional object intersecting a plurality of slices. In particular, it is desirable that the space D disposed between neighboring slices be filled, in whole or in part, so that the resulted image is more smoothed in appearance.

Figure 5:
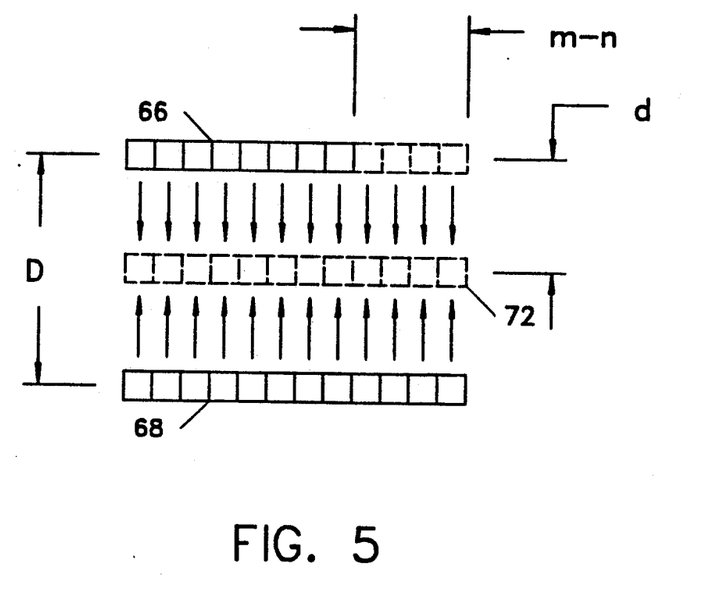
FIG. 5 illustrates first and second interpolations of neighboring vectors to form a third vector.

Turning now to FIG. 5, the system for achieving a vector representative of an intermediate contour or boundary of interest, disposed between neighboring slices 66 and 68 will be described. In the preferred embodiment, calculation of a set of three vectors 72, representative of an approximate boundary of interest disposed between slices 66 and 68 is achieved as follows.

First, each of the three vectors 66 undergoes a linear interpolation such that its m entries are extrapolated to n entries. This interpolation provides the vector 66 with an additional m-n terms.

In a subsequent interpolation, a one-to-one correspondence exists between the interpolated vector 66 and the vector 68. A linear interpolation is then performed, assuming the interpolated vector 72 is displaced at a distance D/2 between slice 66 and slice 68.

Figure 6:
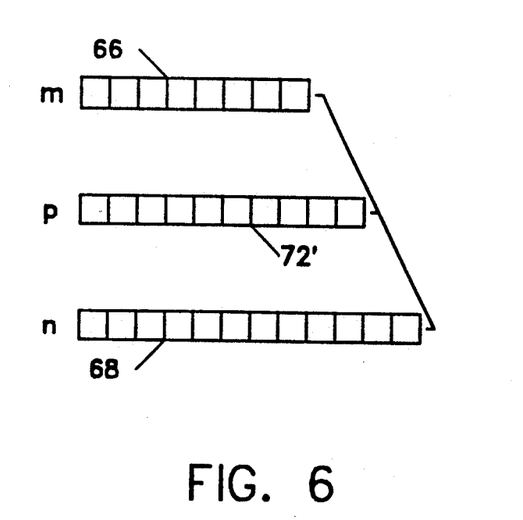
FIG. 6 illustrates a third interpolation which provides for a completed interpolated vector disposed between two neighboring vectors.

Turning now to FIG. 6, a final interpolation step is illustrated. The vectors 72' is calculated by a linear interpolation of the entries for vector 72 (FIG. 5) to a number disposed intermediate the lengths of the two vectors 66 and 68, or (m-n)/2 entries greater than the length of vectors m (or less than the length of vectors n). Fractional values are suitably truncated. In this fashion, an interpolated vector set disposed between two neighboring vector sets is formed. It will be appreciated, however, that a plurality of interpolated slices may also be made, preferably equally spaced, between a pair of original slices.

Figure 7:
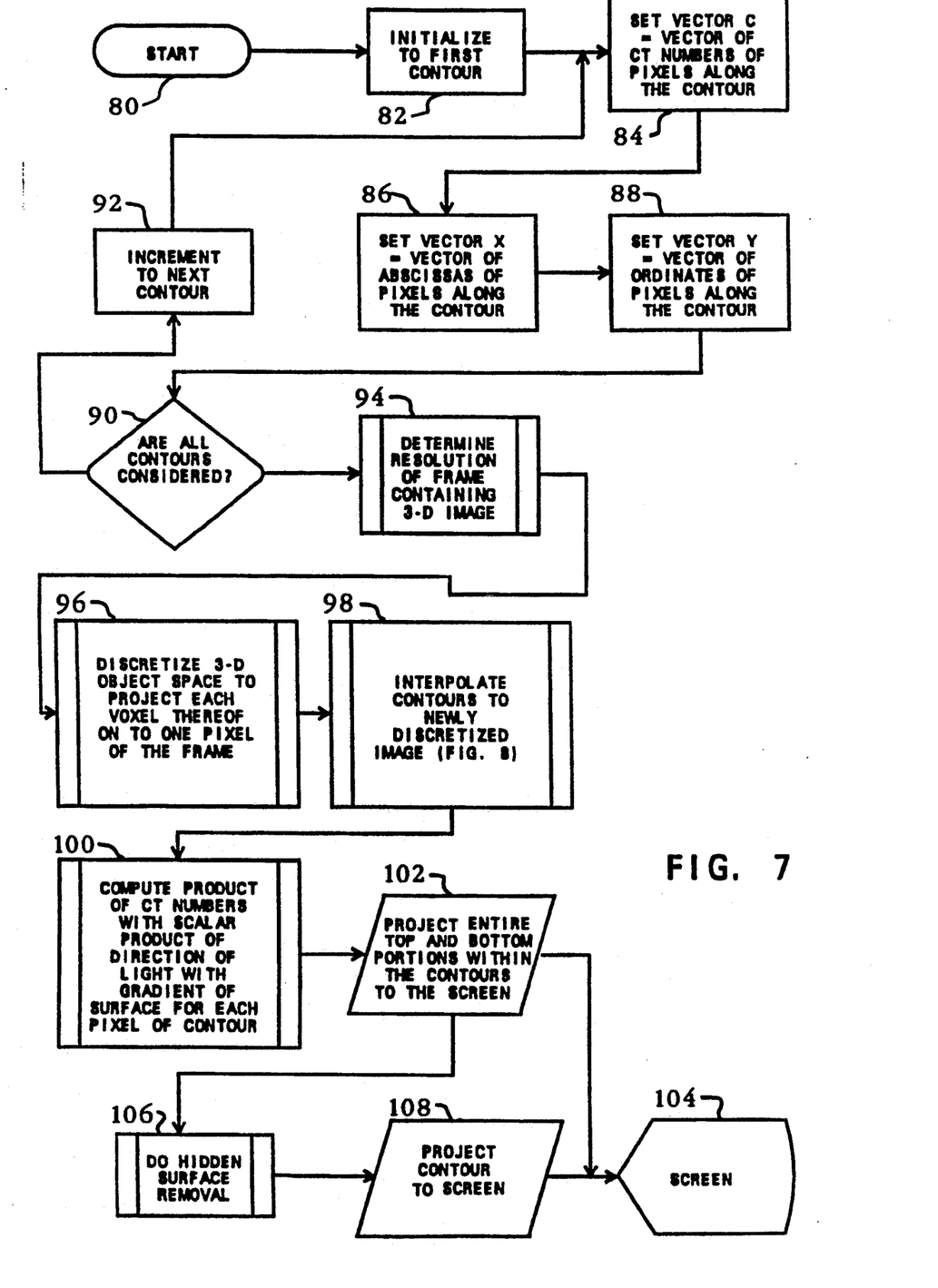
FIG. 7 illustrates a system for accomplishing generation of a three-dimensional image from a series of two-dimensional image slices in accordance with the subject invention.

Turning now to FIG. 7, the system for forming three-dimensional images from a series of generally parallel two-dimensional image slices is presented in flow chart form. Operation is commenced at step 80 and progresses to step 82 whereat a first boundary of interest or contour is initialized. In a step 84, a vector C is set equal to a vector of CT numbers of pixels along the second contour. A vector X and a vector Y, representative of the abscissas and ordinates of the pixels along the contour, respectively, are then set in steps 86 and 88. Steps 90 and 92 facilitate consideration of all vectors through repeated progression through steps 84, 86, and 88.

Once vector sets have been acquired for all contours, a desired resolution of a frame containing a three-dimensional image is computed in step 94. In this step, the number of pixels, and the pixel size of the frame or screen which will contain the resultant three-dimensional image, is ascertained.

In a step 96, the three-dimensional object space is discretized so that each voxel of a discretized object will be projected onto one pixel of the frame determined in conjunction with step 94.

In a step 98, linear interpolation to create vectors disposed intermediate neighboring vectors is computed.

Step 100 is provided to add a depth effect to a three-dimensional object, given that it will ultimately be projected on a two-dimensional surface. This is suitably accomplished by computing the product of a viewing value, such as a CT number, with a scaler product of the direction of light to a selected projection screen with a gradient of a surface for each pixel of each contour. In a step 102, the entire top and bottom portions of a three-dimensional image, within the contours of boundaries of interest of the axial images, are projected to an associated viewing screen 104. Hidden surfaces are masked from the view in step 106.

Remaining contours are passed to a step 108, at which step contours are projected to a screen. Again, hidden surfaces in the resultant three-dimensional image are removed at step 106'. This is suitably accomplished while completing orthogonal projections of the vector elements to the screen. Preferably, matrices of distance and/or a viewing value or CT number (weighted with an inner-product of the gradient of the surface and the light direction) are formed simultaneously at step 110, prior to projection to screen 104.

More precisely, a voxel on a contour projects onto a pixel on the screen. If (i,j) are the coordinates of the pixel, for example, a distance of the voxel to the screen replaces the content of the element (i,j) of the distance matrix if the distance is less than the content of the element represented thereby. In such cases, the viewing value or CT number of a particular voxel replaces a content of the element (i,j) of the viewing value or CT number matrix.

Figure 8:
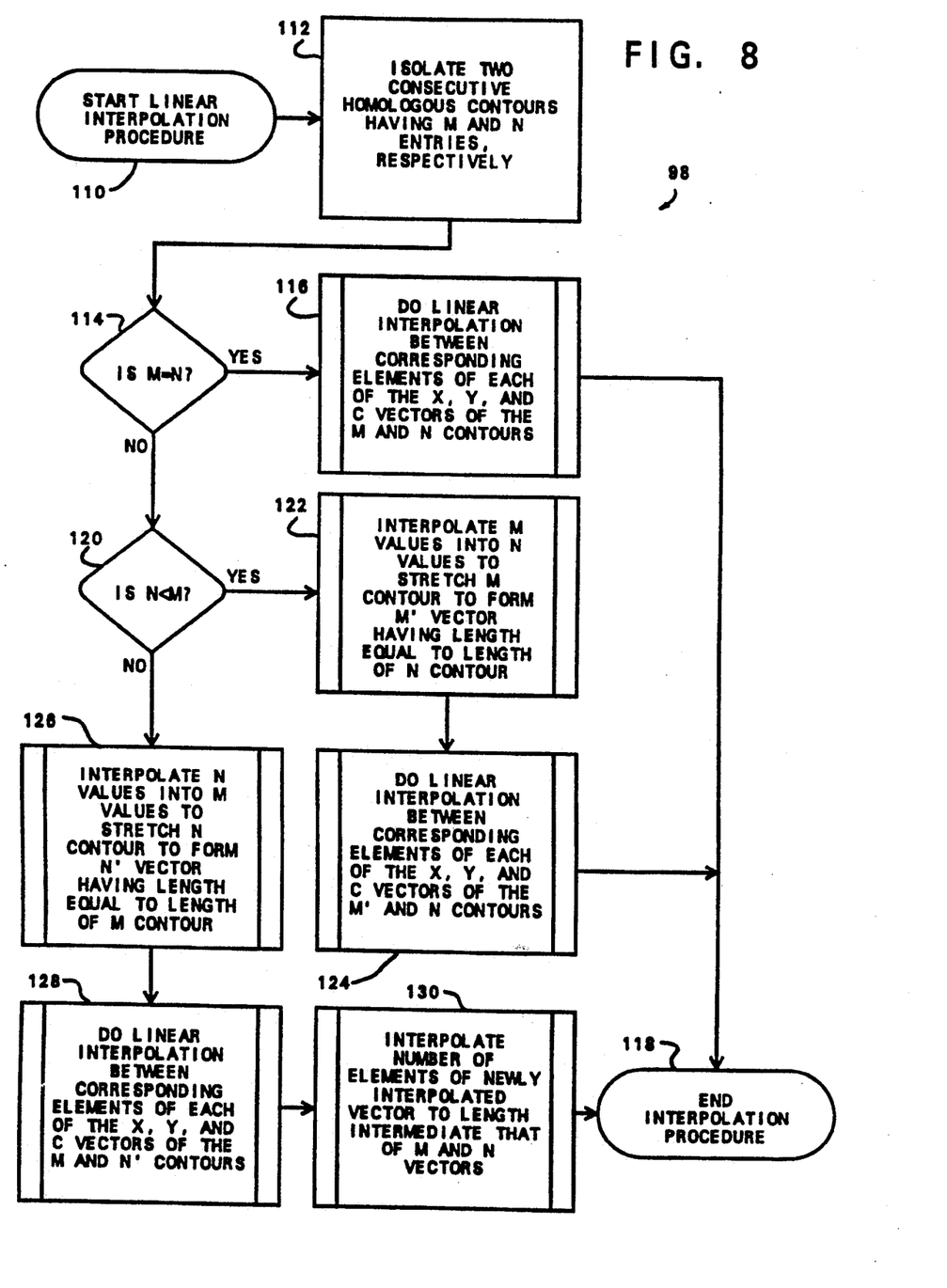
FIG. 8 illustrates in detail the interpolation step of the system of FIG. 7.

Turning now to FIG. 8, the interpolation step 98 of FIG. 7 will be disclosed with greater particularity. After commencement of the interpolation procedure at 110, two consecutive homologous boundaries of interest of contours, having m and n entries respectively, are isolated at step 112.

A determination is made at step 114 whether the number of entries in the vectors of the respective contours is made. In the event of equivalency, a direct linear interpolation between elements of the respective vectors is accomplished in step 116, after which time the interpolation procedure is completed at step 118. If it is determined, in step 114, that the vectors have different lengths, the system progress to a step 120.

Step 120 determines which vector set of the neighboring contours have greater lengths. In accordance with this test, the system proceeds to steps 122, 124, or 126, 128, which have equivalent functions, but treat the vector sets oppositely.

In steps 122 and 126, a first interpolation is made to "stretch" the shorter of the vectors to a length equivalent to that of the longer of the vectors, as will be described with particularity below. Although stretching is utilized in the preferred embodiment, it will be appreciated that an interpolated "shrinking" of the larger vectors into a length equivalent to that of the shorter vector is also suitable. Steps 124 and 128 accomplish a direct linear interpolation between respective elements, analogously to that of step 116. After completion of step 124 or 128, an interpolation is made wherein the resultant, interpolated vector is sized intermediate the length of the neighboring vectors from which it was formed in a step 130.

In summary, the system illustrated by the flow chart of FIG. 8 provides for ascertaining an intermediately disposed vector set by stretching the smaller vector set, performing a linear interpolation, and then by shrinking the length of the intermediate vector to a length disposed intermediate the neighboring vectors from which it was formed. As noted above, however, the system will function equally well with an interpolation with which a narrowing of the longer vector sets is accomplished prior to interpolation.

Figure 9:
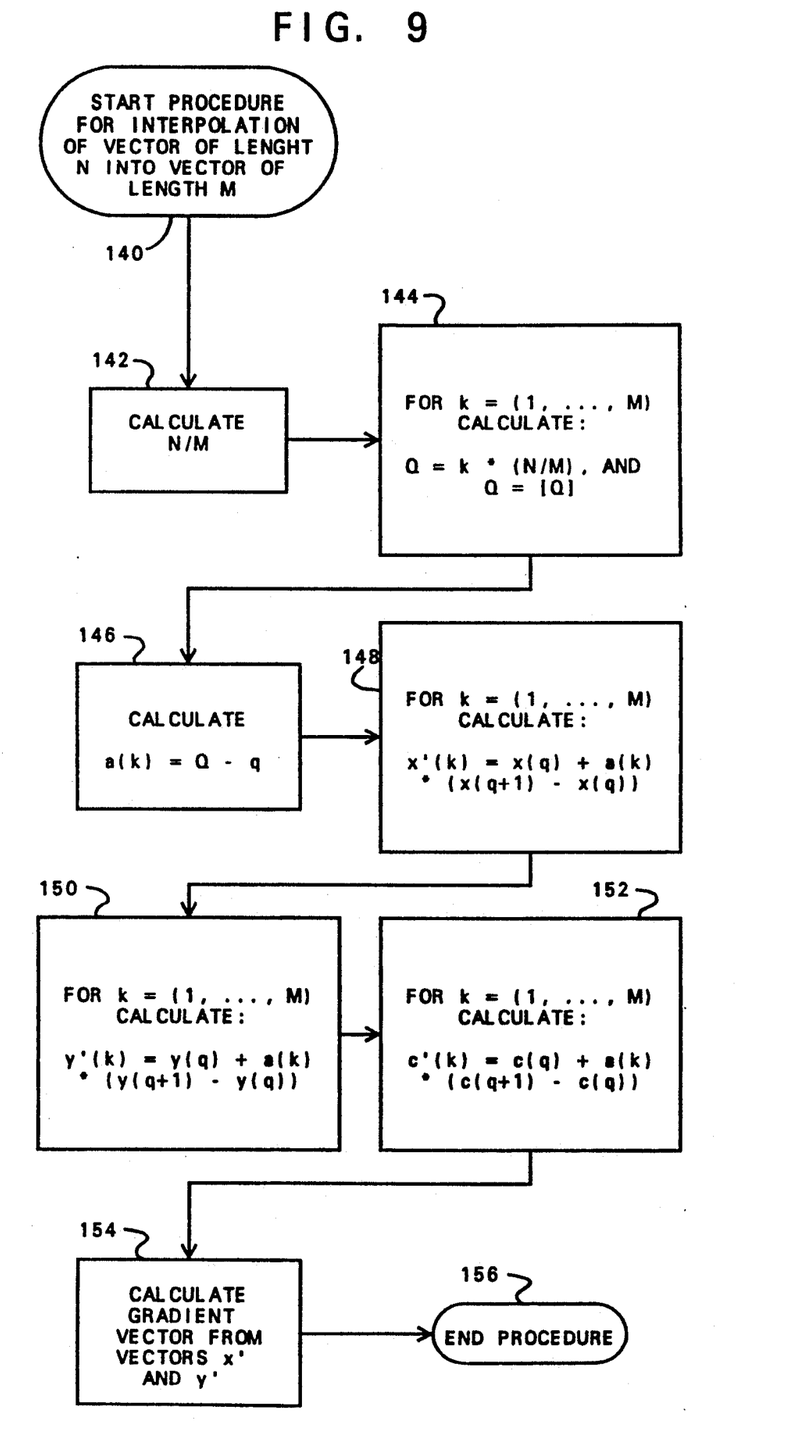
FIG. 9 illustrates in detail interpolation in accordance with the systems of FIG. 7 and FIG. 8.

Turning now to FIG. 9, the stretch/shrinking interpolation procedure will be described with particularity. In the illustrated procedure, step 140 illustrates commencement of a routine for interpolation of a vector of length n into a vector of length m. In a step 142, the ratio of n to m is calculated. In a step 144, for each entry 1 to m, a value Q is calculated by the illustrated equation. The value q is calculated as the integer portion of the value Q.

In a step 146, a value $a_k$ is calculated as Q-q, where k is 1, ..., m.

In steps 148, 150, and 152, vector elements $x'_k$, $y'_k$, and $c'_k$ are calculated via an interpolation. A gradient vector is then calculated from vectors X' and Y' in a step 154. The procedure is terminated in a step 156.

The invention has been described with reference to the preferred embodiments. Obviously, modifications and alterations will occur to others upon the reading and understanding the specification. It is intended that all such modifications and alternations to be included insofar as they come within the scope of the appended claims or the equivalents thereof.

Having thus described our invention, we now claim:

1. A method for forming three-dimensional images from a plurality of two-dimensional images comprising the steps of:
   acquiring a series of generally parallel slices from an associated specimen, each slice being represented by a generally planar array of voxels, each voxel being defined by unique first and second spatial dimensions along the slice, and a viewing value representative of a physical characteristic of the associated specimen thereat;
   isolating a subset of voxels along a boundary of interest in each slice, which boundary of interest defines a region of interest;
   for each slice,
      defining a first vector array of data representative of the first coordinate of each subset of voxels thereof;
      defining a second vector array of data representative of the second coordinate of each subset of voxels thereof;
      defining a third vector for each subset of data representative of the viewing value for each subset of voxels thereof;
   discretizing a three-dimensional object represented by the first, second, and third vectors of each boundary of interest of each slice such that each voxel thereof maps to a pixel of an associated picture frame; and
   projecting the discretized object to the picture frame.

2. The method of claim 1 further comprising a slice interpolation step of interpolating, from homologous boundaries of interest of neighboring slices, a subset of voxels representative of an intermediate boundary of interest displaced intermediate each of the neighboring slices.

3. The method of claim 2 further comprising a vector interpolation step of interpolating, prior to the slice interpolation step, the boundaries of interest of neighboring slices to equivalent lengths between corresponding first, second, and third vectors.

4. The method of claim 3 further comprising the step of masking selected portions of a discretized object from projection to the picture frame.

5. The method of claim 4 further comprising the step of selectively scaling voxels of a discretized image in accordance with a relationship between the discretized image and a direction of projection to the picture frame, whereby a projected image on the picture frame includes depth shading.

6. A system for generating a three-dimensional image from a series of two dimensional images comprising:

acquisition means for acquiring a series of generally parallel slices, from an associated specimen, each slice being represented by a generally planar array of voxels, each voxel being defined by unique first and second spatial dimensions along the slice, and a viewing value representative of a physical characteristic of the associated specimen thereat;

selection means for isolating a subset of voxels along a boundary of interest in each slice, which boundary of interest defines a region of interest;

vector generating means for generating vector data representative of the boundary of interest in each slice comprised of,
- a first vector array of data representative of the first dimension of each subset of voxels thereof;
- a second vector array of data representative of the second dimension of each subset of voxels thereof;
- a third, vector for each subset of data representative of the viewing value for each subset of voxels thereof;

means for discretizing a three-dimensional object represented by the first, second, and third vectors of each boundary of interest of each slice such that each voxel thereof maps to a pixel of an associated planar picture frame; and means for projecting the discretized object to the picture frame.

7. The system of claim 6 further comprising a slice interpolation means for interpolating, from boundaries of interest of neighboring slices, a subset of voxels representative of an intermediate boundary of interest displaced intermediate each of the neighboring slices.

8. The system of claim 7 further comprising a vector interpolation means for interpolating, prior to the slice interpolation step, the boundaries of interest of neighboring slices to equivalent lengths between corresponding first, second, and third vectors.

9. The system of claim 8 further comprising a masking means for masking selected portions of a discretized object from projection to the picture frame.

10. The system of claim 9 further comprising scaling means for selectively scaling voxels of a discretized image in accordance with a relationship between the discretized image and a direction of projection to the picture frame so that each voxel is projected to a single pixel of the picture frame, whereby a projected image on the picture frame includes depth shading.

11. A three-dimensional image generator comprising:
slice generating means for generating a series of N generally parallel two-dimensional image slices, each image slice being comprised of a generally planar array of spatially encoded voxels, each of which is assigned gray-scale value in accordance with a physical property of an associated specimen corresponding thereto;

means for selecting a boundary of interest in each of the image slices, which boundary of interest defines a region of interest;

means for isolating boundary voxels of each two-dimensional image slice which intersect the boundary of interest;

means for representing the boundary voxels for each of the slices as a three vectors, including a first vector representative of a first spatial dimension of each voxel, a second vector representative of a second spatial dimension of each voxel, and a third vector representative of a gray-scale value for each voxel;

slice interpolation means for interpolating first, second and third vectors for N additional slices, each of which is disposed intermediate two of the image slices, from first, second, and third vectors associated with the two of the image slices adjacent thereto, where N is defined as any positive integer; and means for discretizing a three-dimensional object represented by the first, second, and third vectors of each of the slices such that each voxel represented thereby maps to a pixel of an associated picture frame.

12. The three-dimensional image generator of claim 11 further comprising means for selectively performing M additional iterations of interpolating first, second, and third vectors disposed intermediate each two previous slices, where M is defined as any integer value greater than one.

13. The three-dimensional image generator of claim 12 wherein the slice interpolation means includes:
comparison means for comparing a lengths of vectors of neighboring slices; and
vector interpolation means for calculating a linear interpolation among elements of the shorter of the vectors of the neighboring slices, as dictated by the comparison means, to a lengthened vector having number of elements equal to that of the larger of the vectors of the neighboring slices.

14. The three-dimensional image generator of claim 13 further comprising means for calculating a linear interpolation between respective elements of the longer of the vectors and the lengthened vector to achieve the interpolated first, second, and third vectors disposed between the neighboring slices.

15. The three-dimensional image generator of claim 14 wherein the slice generating means is comprised of a magnetic resonance imaging device.

16. The three-dimensional image generator of claim 14 wherein the slice generating means is comprised of a computed tomography scanner.

17. The three-dimensional image generator of claim 14 further comprising means projecting a discretized object to an associated picture frame.

18. The three-dimensional image generator of claim 17 further comprising means for masking selected portions of a discretized object from projection to the associated picture frame.

19. A method of three-dimensional image generation comprising the steps of:
(a) acquiring a series of generally parallel slices, from an associated specimen, each slice being represented by a generally planar array of voxels, each voxel being defined by unique first and second spatial dimensions along the slice, and a viewing value representative of a physical characteristic of the associated specimen thereat;
(b) isolating a subset of voxels along a boundary of interest in a first slice of the series of slices, which boundary of interest defines a region of interest;
extrapolating the boundary of interest to remaining slices of the series of slices to define a three-dimensional object of interest;
(c) for each slice,
(i) defining a first vector array of data representative of the first coordinate of each subset of voxels thereof;

(ii) defining a second vector array of data representative of the second coordinate of each subset of voxels thereof; and
(iii) defining a third vector for each subset of data representative of the viewing value for each subset of voxels thereof;

discretizing a three-dimensional object represented by the first, second, and third vectors of each boundary of interest of each slice such that each voxel thereof maps to a pixel of an associated picture frame; and projecting the discretized object to the picture frame.

20. The method of claim 19 further comprising the steps of selecting an area of interest within the first slice and extrapolating the area of interest to the remaining slices, prior to step (b).

* * * * *